United States Patent
Chamberlin

(10) Patent No.: US 11,072,232 B2
(45) Date of Patent: Jul. 27, 2021

(54) HYBRID DRIVE MODULE HAVING AN ELECTRIC MOTOR

(71) Applicant: BorgWarner Sweden AB, Landskrona (SE)

(72) Inventor: Bradley Duane Chamberlin, Pendelton, IN (US)

(*) Notice: Subject to any disclaimer, the term of this patent is extended or adjusted under 35 U.S.C. 154(b) by 84 days.

(21) Appl. No.: 16/327,518

(22) PCT Filed: Aug. 30, 2017

(86) PCT No.: PCT/EP2017/071802
§ 371 (c)(1),
(2) Date: Feb. 22, 2019

(87) PCT Pub. No.: WO2018/041913
PCT Pub. Date: Mar. 8, 2018

(65) Prior Publication Data
US 2019/0176608 A1    Jun. 13, 2019

(30) Foreign Application Priority Data
Aug. 31, 2016    (SE) .................................... 1651168-5

(51) Int. Cl.
*B60K 6/485*    (2007.10)
*B60K 6/405*    (2007.10)
*F16H 57/04*    (2010.01)
*G21C 3/33*    (2006.01)
*F16H 57/05*    (2006.01)

(52) U.S. Cl.
CPC .............. *B60K 6/485* (2013.01); *B60K 6/405* (2013.01); *F16H 57/04* (2013.01); *F16H 57/0404* (2013.01); *F16H 57/0412* (2013.01); *F16H 57/05* (2013.01); *G21C 3/331* (2013.01); *G21C 3/3315* (2013.01); *Y02E 30/30* (2013.01); *Y02T 10/62* (2013.01)

(58) Field of Classification Search
CPC .......... B60K 1/00; B60K 6/485; B60K 6/405; F16H 57/05
See application file for complete search history.

(56) References Cited

U.S. PATENT DOCUMENTS 6,166,498 A * 12/2000 Yamaguchi ............. B60L 50/16
                                                         318/34
6,201,365 B1    3/2001 Takeshi et al.
7,859,147 B2 * 12/2010 Dubuc .................. H02K 11/048
                                                         310/68 D
(Continued)

FOREIGN PATENT DOCUMENTS

DE    102007057984 A1    6/2009
EP        0776779 A2    6/1997
(Continued)

OTHER PUBLICATIONS

Swedish Application No. 1651168-5 filed Aug. 31, 2016 Search Report dated Mar. 13, 2017, 3 pages.

*Primary Examiner* — John D Walters
*Assistant Examiner* — James J Triggs

(57) ABSTRACT

A hybrid drive module, comprising an electric motor (110) and a power electronics module (300) operatively connected to the electric motor (110) whereby the power electronics module is integral to the electric motor (110).

12 Claims, 4 Drawing Sheets

(56) References Cited

U.S. PATENT DOCUMENTS

| | | | | |
|---|---|---|---|---|
| 8,456,049 B2* | 6/2013 | Matsuda | ................ | H02P 25/22 |
| | | | | 310/71 |
| 8,853,898 B2* | 10/2014 | Takechi | ............... | H02K 11/048 |
| | | | | 310/64 |
| 8,970,076 B2* | 3/2015 | Isoda | .................. | H02K 11/046 |
| | | | | 310/59 |
| 9,603,287 B1* | 3/2017 | Chien | .................. | H01L 25/162 |
| 10,381,902 B2* | 8/2019 | Fukushima | ............ | H02K 7/006 |
| 2005/0110278 A1 | 5/2005 | Fan | | |
| 2010/0175933 A1* | 7/2010 | Yoshida | .................. | B60K 6/26 |
| | | | | 180/65.1 |
| 2011/0303048 A1 | 12/2011 | Genise | | |
| 2014/0306563 A1* | 10/2014 | Oyama | .................. | H02K 3/28 |
| | | | | 310/71 |
| 2015/0210157 A1 | 7/2015 | Yokoyama et al. | | |

FOREIGN PATENT DOCUMENTS

| | | | |
|---|---|---|---|
| WO | 2005110795 A1 | 11/2005 | |
| WO | 2015170383 A1 | 11/2015 | |

\* cited by examiner

HYBRID DRIVE MODULE HAVING AN ELECTRIC MOTOR

This application claims the benefit of Swedish Application No. 1651168-5 filed Aug. 31, 2016 and PCT Application No. EP2017/071802 filed Aug. 30, 2017.

TECHNICAL FIELD

The present invention relates to a hybrid drive module, and in particular to the electric motor of such hybrid drive module.

BACKGROUND

Hybrid powertrains for passenger cars are gaining interest and various solutions for such applications have been proposed during the recent years. Especially it has been suggested to provide the hybrid functionality as a separate module which is added to the existing powertrain. One example of an existing hybrid drive module includes a first sprocket which is intended to be connected to the crank shaft of the internal combustion engine indirectly via a dual mass flywheel and a disconnect clutch, and an electrical motor, preferably a 48V electrical motor, being drivingly connected to a second sprocket. The sprockets are connected by means of a belt, thus forming a belt drive, in order to allow for various driving modes such as pure electrical driving, recuperation, traction mode, and boost. In this prior art system the electrical motor, the flywheel, the clutch, and the belt drive are formed as a standalone module which can be added to an existing powertrain.

Hybrid vehicles typically comprise a power electronics unit for converting power from a voltage source (e.g. battery) to the electric motor. Power electronic devices are used to provide power to any loads. Power electronic devices may comprise solid state devices such as transistors and power switches, rectifiers etc. Amongst other functions the power electronics devices in hybrid vehicles generally convert direct current power to alternating current power for the electric motor. Such that power can be provided to the load, power electronic devices are typically connected with high power cabling to the battery and to the electric motor.

One typical aspect of power electronics devices is that they require substantial high power capacity cabling between the load and the power electronics device. High power cabling is both expensive and increases the weight of the vehicle. Furthermore, power electronics devices generate a substantial amount of heat, whilst reducing the packaging size of the power electronics is ideal with respect to weight the subsequent heat generation generally leads to reduced performance and reliability.

An improved hybrid drive module having a power electronics device with improved performance, reliability and reduced weight and cost would clearly be ideal.

SUMMARY

It is thus an object of the teachings herein to provide an improved hybrid drive module overcoming the disadvantages of prior art solutions.

According to a first aspect, a hybrid drive module is provided. The hybrid drive module comprises an electric motor and a power electronics module operatively connected to the electric motor whereby the power electronics module is integral to the electric motor. The power electronics being integral to the electric motor saves weight and reduces the number of components in the drive module.

In one embodiment the hybrid drive module comprises a housing and a chain drive connecting the electric motor with a crank shaft of an associated internal combustion engine via at least one coupling. The housing further comprises a reservoir having an inlet configured to receive oil from the chain during operation and an outlet arranged to distribute oil to the electric motor. The electric motor and integral power electronics are thus cooled.

In an embodiment the at least one coupling is at least one clutch of a parallel two clutch system. In such a system The hybrid drive module comprises a part of a P2 clutch system.

In an embodiment the electric motor and power electronics module are thermally connected.

In one embodiment the power electronics module forms an electric motor module.

The power electronics module may be configured to receive power from the electric motor.

In an embodiment the power electronics module is operatively connected to vehicle electronic systems. The power electronics module may be configured to provide ECU functions.

In one embodiment the vehicle ECU functions include hybrid drive sensors.

In a second aspect an engine assembly is provided. The engine assembly comprises an internal combustion engine and a hybrid drive module comprising an electric motor and a power electronics module according to any one of the disclosed embodiments. The housing is formed by an end section of an engine block of said internal combustion engine and an ear structure extending out from said end section and the power electronics module is integral to the electric motor.

In a third aspect a hybrid vehicle is provided. The hybrid vehicle comprises an engine assembly according to the second aspect.

BRIEF DESCRIPTION OF THE DRAWINGS

Embodiments of the teachings herein will be described in further detail in the following with reference to the accompanying drawings which illustrate non-limiting examples on how the embodiments can be reduced into practice and in which.

DETAILED DESCRIPTION

Figure 1:
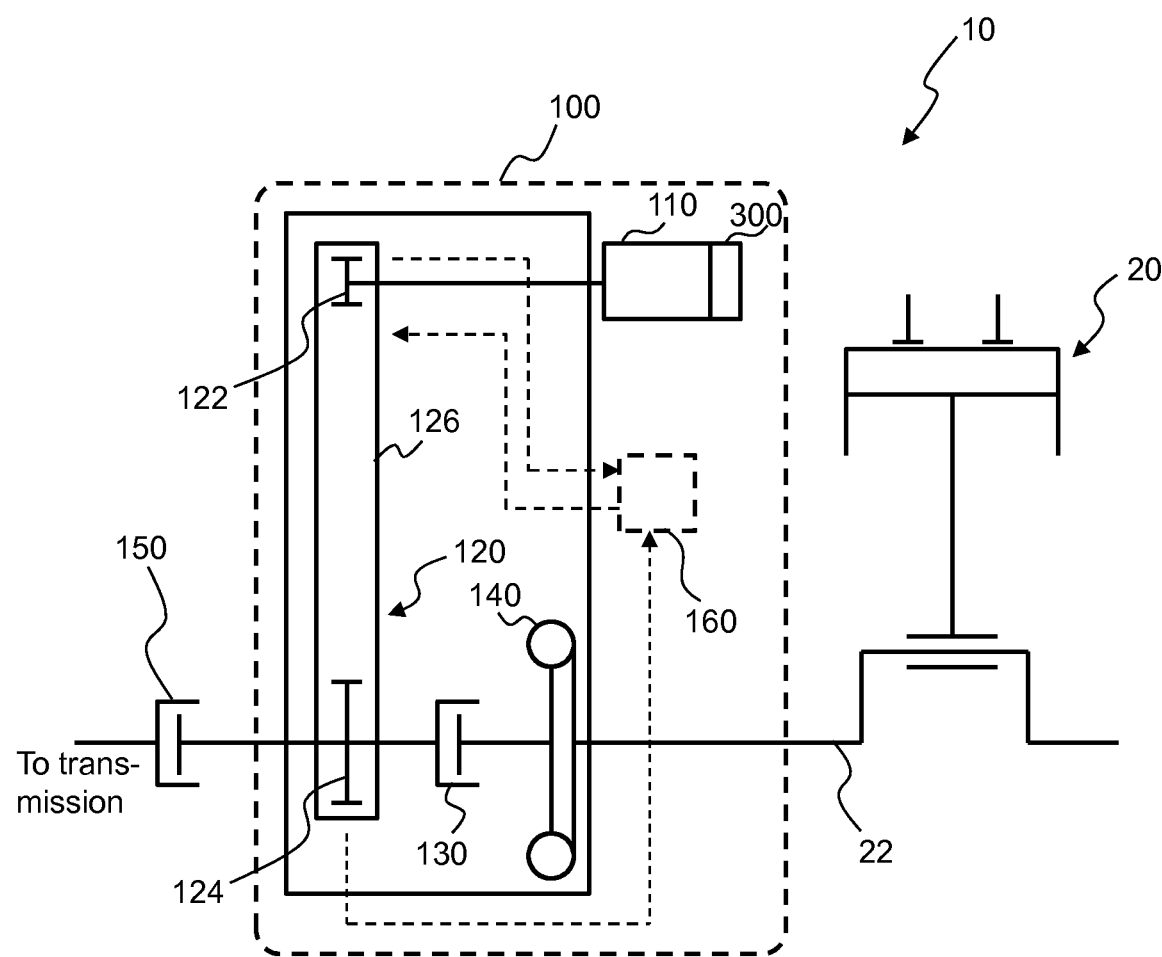
FIG. 1 shows a schematic outline of a hybrid drive module according to an embodiment.

Starting in FIG. 1 a schematic layout of an engine assembly 10 of a vehicle is shown. The vehicle is typically a passenger car, and the engine assembly 10 comprises an internal combustion engine 20 and a hybrid drive module 100 according to an embodiment. As will be explained in the following the hybrid drive module 100 is mechanically connected to a crankshaft 22 of the internal combustion engine 20 in order to provide additional drive torque to a transmission (not shown) arranged in series with the hybrid drive module 100. Hence, the transmission is also connected to the crank shaft 22 as is evident from FIG. 1.

The hybrid drive module 100 comprises an electrical motor 110 and a chain drive 120 connecting the electrical motor 110 with the crank shaft 22. The electrical motor 110 is for this purpose driving a first sprocket 122 of the chain drive 120, whereby upon activation of the electrical motor 110 rotational movement of the first sprocket 122 is transmitted to a second sprocket 124 of the chain drive 120 via a chain 126.

The second sprocket 124 is drivingly connected to the crank shaft 22 via one or more couplings. In the embodiment shown in FIG. 1, the second sprocket 124 is connected to the output of a disconnect clutch 130 receiving driving torque from a dual mass flywheel 140. For parallel two-clutch systems, commonly denoted hybrid P2 systems, the disconnect clutch 130 is often referred to as the C0 clutch. The dual mass flywheel 140, which could be replaced by another torsional damping/absorption device, receives input torque directly from the crank shaft 22. However, for the purpose of the present embodiments either the disconnect clutch 130 and/or the dual mass flywheel 140 (or its substitute) could be omitted or replaced by another suitable coupling.

Also illustrated in FIG. 1 is a further optional clutch 150, here representing a launch clutch. Again referring to P2 systems, the launch clutch is often referred to as the C1 clutch. The launch clutch 150 is arranged downstream, i.e. on the output side of the hybrid drive module 100 upstream the transmission. It should be realized that the launch clutch 150 could be replaced by a torque converter or similar.

The electrical motor 110 is preferably a 48V motor/alternator which thus can be used to provide hybrid functionality to the existing powertrain of the vehicle. For other embodiments, also possible within the scope of this application, high voltage hybrid electrical motors may be utilized. More specifically, the provision of the chain drive 120 allows for modularity with high voltage hybrid electrical motors in comparison to if a belt drive would be used. A belt drive could never accommodate the much higher loads provided by a more powerful high voltage hybrid electrical motor.

The hybrid drive module 100 also comprises a power electronics device being a power electronics module 300. The power electronics module 300 is operatively connected to the electrical motor 110. The power electronics module 300 may control and power the electric motor 110. The power electronics module 300 may be integral to the electric motor 110. An electric motor 110 comprising an integral power electronics module 300 has a reduced need for expensive high power cabling within the vehicle. Furthermore, the total distance of high power cabling increases the weight of the total hybrid drive module 100. A reduction in high power cabling within the hybrid drive module 100 reduces the weight of the hybrid drive module 100. The power electronics module 300 and the electric motor 110 may be provided in a single package, whereby the electric motor 110 and the power electronics module form an electric motor module. The power electronics module 300 and the electric motor 110 may further be provided in a single housing. The power electronics module 300 is in such cases not external to the hybrid drive module 100.

The power electronics module 300 is configured to provide the electric motor 110 with the voltage and power required for electric motor operation. For example, the power electronics module 300 may provide the electric motor 110 with 48V. The power electronics module 300 can also provide power for a higher voltage electric motor. In such instances the power electronics module may be configured to provide the electric motor with, for example, 48V-700V. The power electronics module may also be configured to receive AC power generated in the electric motor 110. The power generated in the electric motor 110 may be converted to DC power for storage in an energy storage unit such a battery.

The power electronics module 300 may be further configured to provide power to other vehicle systems. The power electronics module 300 may also be programmed to provide ECU functions to other components within the hybrid drive module 100, such as electric motor control, processing of sensor data, controlling actuators, etc. For the case of controlling actuators, the power electronics module 300 may be configured to control the actuator of the disconnect clutch 130. The power electronics module 300 may also provide power for sensors comprised within the hybrid drive module 100. In such instances the power electronics module may be configured to provide a plurality of voltages, where each voltage is matched to the voltage required for each vehicle system. For example, the sensors may require a 24V power input, the power electronics module 300 may in such instances provide a 48V power input to the electric motor 110 and a 24V power input to the sensors. The power electronics module 300 may be configured to provide any relevant voltage such as but not limited to 3.5V, 5V, 12V, 48V etc. The power electronics module 300 may be configured to convert AC power generated by the electric motor 110 in to DC power for distribution to the other vehicle systems. In some instances the power generated in the electric motor 110 does not need to be first transmitted to an energy storage unit such as a battery, it may be converted to DC power and subsequently distributed to the other vehicle systems without passing the energy storage unit.

The entire hybrid drive module 100 also comprises a lubrication system which according to the various embodiments presented herein is based on principle that the chain 126 will assist in circulating lubrication oil to the rotating parts of the hybrid drive module 100, i.e. the one or more couplings 130, 140. It should further be noted that in case of also utilizing a launch clutch or torque converter 150, this component could also be arranged within the hybrid drive module 100 thus taking benefit from the same lubrication system.

In some embodiments the lubrication system could be supported by an oil pump 160 which also may be controlled by the power electronics module 300.

Lubrication oil should within the context of this disclosure be interpreted broadly to cover any automatic transmission fluid, engine oil, or other type of lubricating and cooling fluid suitable for the particular application.

Figure 2:
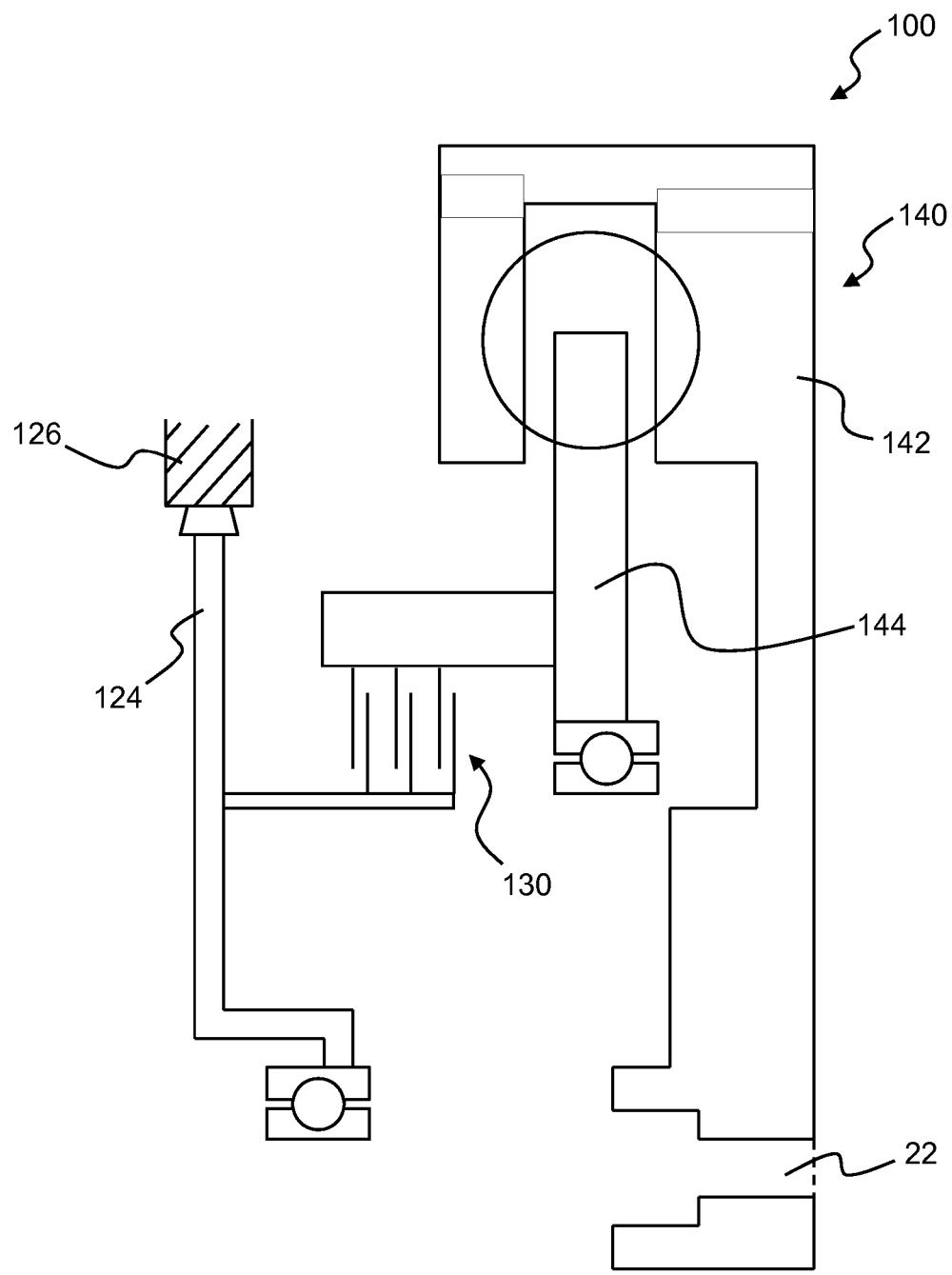
FIG. 2 is a cross-sectional view of parts of a hybrid drive module according to an embodiment.

For a general understanding of the hybrid drive module 100, in FIG. 2 a cross-section of parts of the hybrid drive module 100 is shown, illustrating the compactness of the hybrid drive module 100.

The crank shaft 22 provides input torque to a primary inertial mass 142 of the dual mass flywheel 140. A secondary inertial mass 144 of the dual mass flywheel 140 is in turn connected to an input side of the disconnect clutch 130, here in the form of a limited slip coupling. The output side of the disconnect clutch 130 is connected to the second sprocket 124 carrying the chain 126. Preferably, one or more springs may be provided connecting the internal masses 142, 144 to each other such that the secondary inertial mass 144 may rotate relative the primary inertial mass 142 whereby the springs may deform causing a reduction of torsional vibrations being transmitted from the internal combustion engine 20.

The dual mass flywheel 140 and the disconnect clutch 130 are arranged concentrically around the crank shaft 22, thereby reducing the axial length of the hybrid drive module 100.

Figure 3:
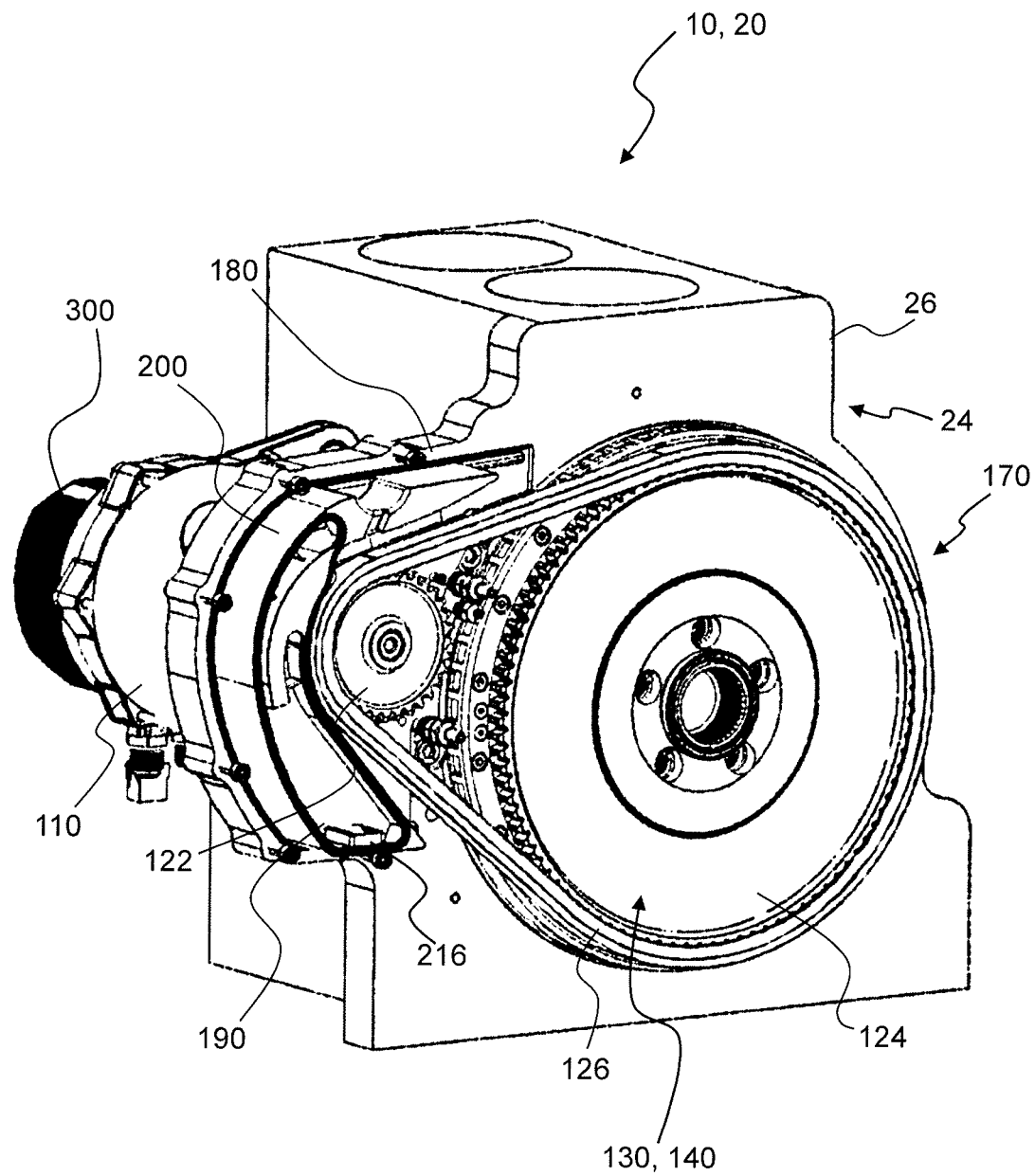
FIG. 3 is a an isometric view of parts of a hybrid drive module according to an embodiment.

In FIG. 3 the engine assembly 10 is again shown. As can be seen the hybrid drive module 100 is enclosed in a housing 170. The housing 170 is formed by an end section 24 of an engine block 26 of the internal combustion engine 20, an ear structure 180 attached to the end section 24 and extending outwards from the engine block 26, and a cassette (see FIG. 5) sealing the housing 170. The ear structure 180 is provided to allow space for the electrical motor 110 and the first sprocket 122 of the chain assembly 120, while the dual mass flywheel 140, the disconnect clutch 130, and the second sprocket 124 are dimensioned to fit within a circular area within the end section 24.

The housing 170 forms a reservoir 190 by means of an insert 200 arranged within the ear structure 180, optionally extending into the circular area within the end section 24. The reservoir 190 is arranged to contain oil during operation, and to provide lubrication to the chain 126 during operation.

The provision of the reservoir 190 allows for a completely passive lubrication system, meaning that no external oil pumps or channels are required to provide sufficient lubrication to the rotating parts of the hybrid drive module 100. More specifically, during operation the chain 126 will throw oil at the upper end of the first sprocket 122, so that the oil will flow into the reservoir 190. When the oil level inside the reservoir reaches a certain height an outlet provided in the reservoir 190 will allow for oil to exit the reservoir 190 at a position where the chain 126 meets the first sprocket 122. By such configuration the chain 126 will be lubricated by its own motion.

The amount of oil which is not transported to the reservoir will eventually fall downwards to the bottom of the housing 170. Since the ear structure 180 is arranged at a vertical position slightly above the lowermost point of the circular area of the end section 26, the oil will end up in the lowermost region of the circular area where the second sprocket 124, the dual mass flywheel 140, the chain 126, and the disconnect clutch rotates. Hence, these rotating parts 124, 126, 130, 140, especially the primary inertial mass 142 of the dual mass flywheel 140, will pick up the oil and propel it around its perimeter. Optionally, the same oil may be passed through a circuit to the rotating parts for improved cooling and lubrication. Such circuit may e.g. include a heat exchanger for removing excessive heat from various components in the hybrid drive module 100.

Eventually, this oil will again flow into the reservoir 190. For this purpose the inlet of the reservoir 190 is dimensioned to receive oil primary from the chain, but also from the other rotating parts 130, 140.

A magnet 216 is preferably arranged at the bottom of the reservoir 190 in order to attract any metal particles contained within the oil. Optionally the magnet 216 may be replaced by or in combination with a filter or other suitable means for cleaning the lubrication fluid during operation.

The embodiments presented above all share the same technical concept of utilizing a passive lubrication system for an entire hybrid drive module 100 using a chain drive 120 and a reservoir 190 by which lubrication oil may be circulated within the hybrid drive module 100.

Figure 4:
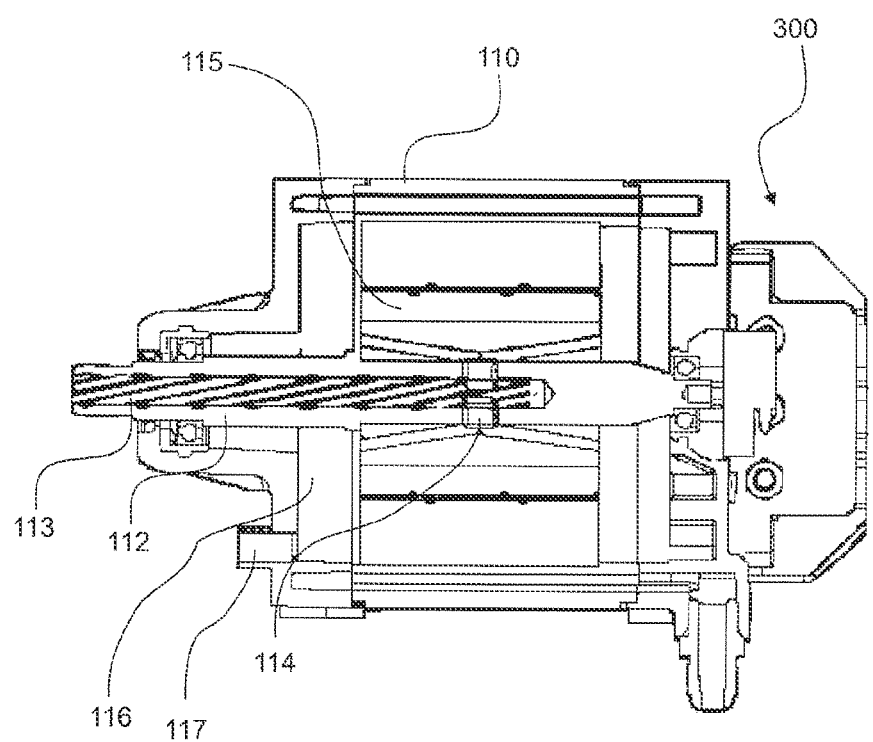
FIG. 4 is a cross-sectional view of parts of an electrical motor for use with a hybrid drive module according to an embodiment.

In FIG. 4 an embodiment of the electrical motor 110 is shown. In this example the electrical motor 110 is configured not only to receive oil from the reservoir 190 for cooling and lubrication of the electrical motor 110, but also to act as a pump in combination with the chain drive 120 for the entire lubrication system of the hybrid drive module 100. It should be noted that the power electronics module 300 is omitted in FIG. 4.

In particular, the rotational shaft 112 of the electrical motor 110 is provided with an axial inlet for receiving oil from the reservoir 190. A passageway 113 inside the rotational shaft 112 transports the oil until it reaches one or more radial drillings 114, where the oil exits and hits the rotor assembly 115. As the rotor assembly is rotating, it will pull oil out of the shaft 112, pass it across the rotor assembly 115, and fling oil onto the end turns 116. The coolant oil could optionally pass onto a heat exchanger used for the electronics to extract heat.

With the outlet holes 114 on the rotor assembly 115 at a radial distance from the center line of the shaft 112, this will create a pumping action to pull the oil through. The oil could then drain back into the cassette 220 to be recirculated again.

An oil cooled motor 110 will allow for a much higher continuous performance level compared to a water cooled electric motor. This is due to the fact that the oil coolant is applied directly to the hot parts of the electric machine, i.e. the copper end-turns in the stator and onto the rotor assembly to cool the magnets.

In systems comprising a power electronics module 300 integral to the electric motor 110 heat generated by the power electronics module 300 may dissipate to the electric motor 110. In such systems cooling of the electric motor 110 has the effect the power electronics module 300 is also cooled. The electric motor and electronics power module receives oil from the reservoir 190 for cooling. The power electronics module 300 may also be cooled directly by oil from the reservoir 190. In systems such as those described above, the power electronics module 300 may be both operatively and thermally connected to the electric motor 110.

It should be mentioned that the improved concept is by no means limited to the embodiments described herein, and several modifications are feasible without departing from the scope of the appended claims.

The invention claimed is:

1. A hybrid drive module, comprising an electric motor and a power electronics module operatively connected to the electric motor whereby the power electronics module is integral to the electric motor, wherein the hybrid drive module comprises a housing and a chain drive connecting the electric motor with a crank shaft of an associated internal combustion engine via at least one coupling, wherein said housing further comprises a reservoir having an inlet configured to receive oil from the chain during operation and an outlet arranged to distribute oil to the electric motor.

2. The hybrid drive module according to claim 1, wherein the at least one coupling is at least one clutch of a parallel two clutch system.

3. The hybrid drive module according to claim 1, wherein the electric motor and power electronics module are thermally connected.

4. The hybrid drive module according to claim 1 wherein the power electronics module forms an electric motor module.

5. The hybrid drive module according to claim 1 wherein said power electronics module is configured to receive power from the electric motor.

6. The hybrid drive module according to claim 1 wherein said power electronics module is operatively connected to vehicle electronic systems.

7. The hybrid drive module according to claim 6 wherein said power electronics module is configured to provide ECU functions.

8. The hybrid drive module according to claim 7 wherein said vehicle ECU functions include hybrid drive sensors.

9. An engine assembly, comprising an internal combustion engine and a hybrid drive module comprising an electric motor and a power electronics module operatively connected to the electric motor whereby the power electronics module is integral to the electric motor, wherein said housing is formed by an end section of an engine block of said internal combustion engine and an ear structure extending out from said end section wherein the power electronics module is integral to the electric motor.

10. A hybrid vehicle, comprising an engine assembly comprising an internal combustion engine and a hybrid drive module comprising an electric motor and a power electronics module operatively connected to the electric motor whereby the power electronics module is integral to the electric motor, wherein said housing is formed by an end section of an engine block of said internal combustion engine and an ear structure extending out from said end section wherein the power electronics module is integral to the electric motor.

11. The hybrid drive module according to claim 1, wherein the electric motor and power electronics module are thermally connected.

12. The hybrid drive module according to claim 2, wherein the electric motor and power electronics module are thermally connected.

* * * * *